March 24, 1959     M. E. HERSTEDT     2,878,610
FISHING POLE ATTACHMENT
Filed July 26, 1957
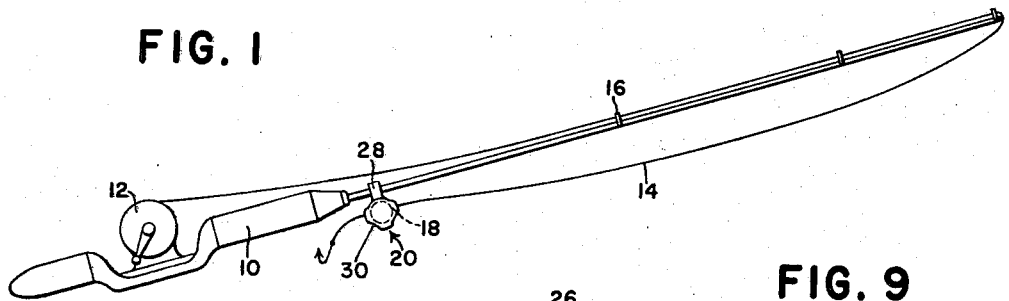
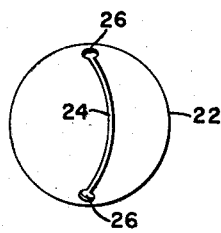
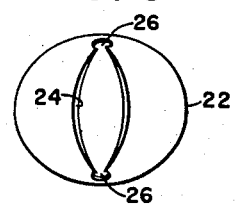
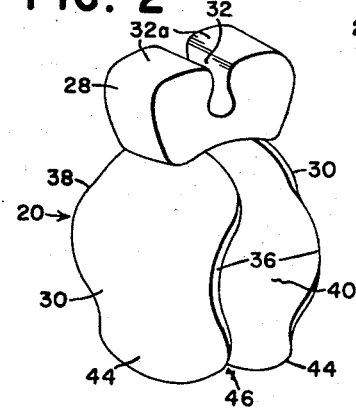
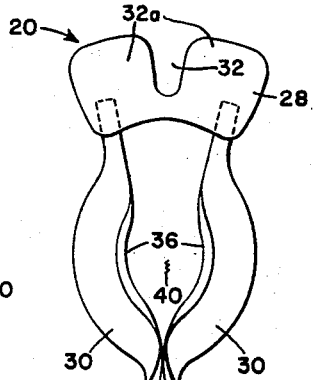
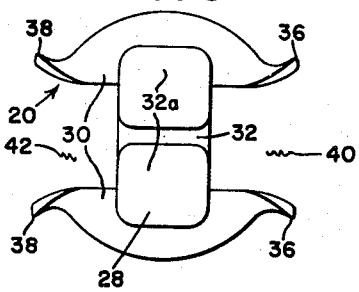
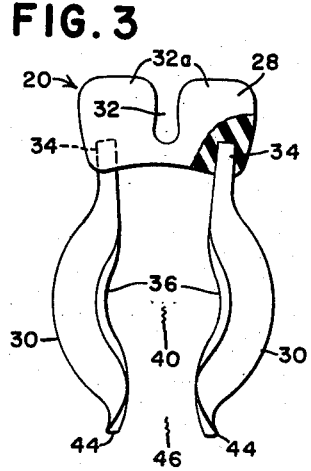
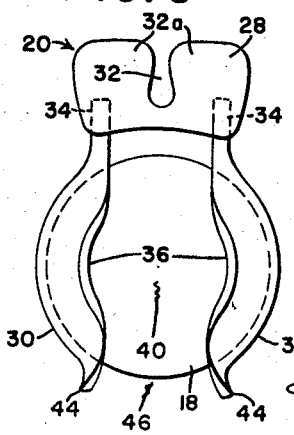
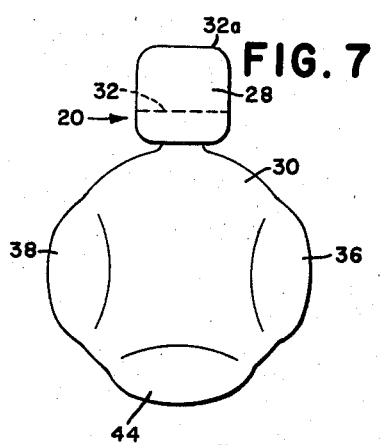
INVENTOR.
M. E. HERSTEDT
BY
ATTORNEY

2,878,610

FISHING POLE ATTACHMENT

Martin E. Herstedt, East Moline, Ill.

Application July 26, 1957, Serial No. 674,408

9 Claims. (Cl. 43—25.2)

This invention relates to a fishing pole attachment and has for a significant object the provision of a novel element having means thereon for releasably gripping a fishing pole and other means thereon for receiving and holding any one of a variety of appurtenant fishing articles such as, but not limited to, a bobber, float, cork, fishhook container, etc.

In its use in receiving a bobber for example, the attachment may be placed at any desired position along the pole and when holding such bobber prevents tangling of the line and is otherwise of extreme convenience and utility.

It is a feature of the invention to form the pole-gripping means of resilient flexible material having a pole-gripping slot therein adapted to grip the pole at any selected position along its length. It is a further feature to provide the article-receiving means in such manner that it acts as lever arm means capable of being spread apart to receive the article and in so doing tends to narrow the slot so as to increase the effectiveness of the jaws forming the pole-gripping means; conversely, when the article receiver is squeezed in the absence of an article, the slot is widened and the jaws are spread and removal of the attachment from the pole is facilitated. An important object resides in the design of the article receiver as a pair of complementary or opposed shells affording a generally spherical receptacle, which is particularly adapted to receive a spherical or partly spherical bobber, etc. Further objects reside in formation of the shells with complementary portions affording a mouth facilitating insertion of the article; shaping the shells with outturned portions accommodating the thumb and finger of the user in the insertion and withdrawal of the article; a novel element which may be of one-piece or other suitable construction employing modern materials such as rubber, plastic or combinations thereof, whereby the element lends itself to mass production; a novel container useful as an adjunct to the receptacle attachment; and such other objects and features, inherent in and encompassed by the invention, as will be apparent from the disclosure here of a preferred embodiment of the invention, by way of example, in the ensuing description and accompanying drawings, the figures of which are described below.

Figure 1 is a general view illustrating the representative utility of the attachment.

Figure 2 is a perspective of the attachment element per se.

Figure 3 is an end view of the element, with a portion in section.

Figure 4 is an end view and shows the shells squeezed together to widen the pole-gripping slot.

Figure 5 is an end view but shows the shells spread apart and holding an article.

Figure 6 is a plan of the element.

Figure 7 is a side elevation of the element.

Figure 8 is a perspective of a spherical container as for fish hooks, etc.

Figure 9 shows the container of Figure 8 deformed to widen the slot therein.

Figure 1 shows what may be taken as a typical fishing pole 10 having a reel 12 from which the line 14 extends through conventional eyes 16 and is attached to a bobber 18. The attachment element is designated in its entirety by the numeral 20 and in Figure 1 is shown as holding the bobber adjacent to the pole handle to prevent tangling of the line. It should be understood that the bobber is only representative of an appurtenant fishing article and that like articles are just as readily accommodated by the element 20. Likewise more than one element such as 20, and of different sizes and shapes if desired, could be mounted on the pole. These variations, like others, are obviously within the spirit and scope of the invention and the possibilities need not be elaborated beyond a few examples. In one instance, a cork (not shown) may be received by the element and fish hooks may be stuck into the cork. Various sizes and styles of bobbers, floats, plugs, weights, etc., could be similarly carried. A container as shown in Figures 8 and 9 could be received in the element.

This container comprises a hollow ball 22 of flexible deformable material, such as rubber or plastic, capable of normally retaining its spherical shape and may be transparent to enable one to see its contents. It has a slot 24 therein terminating at opposite ends in holes 26 provided to relieve stress and to prevent undesirable extension of the slot in use. When the ball is deformed by compressing it, as between the thumb and forefinger (Figure 9), the slot 24 widens to permit the insertion and removal of small items such as fish hooks, weights, etc. When the deforming pressure is released, the ball returns to shape and the slot closes (Figure 8).

The attachment element comprises an upper member 28 and a pair of lower members 30. The upper member is here shown as a resilient flexible block of rubber or equivalent material having in its upper portion a pole-gripping slot 32, which affords a pair of complementary jaws 32a, and the members 30 depend from the lower portion of the block in normally laterally spaced apart relation respectively at opposite sides of the median plane through the slot 32. The members 30 are complementary shells combining to afford a generally spherical receptacle for receiving and holding such article as the bobber 18. These shells may be formed of relatively rigid material, such as any well known plastic suitable for the purpose, and may be transparent, colored, etc., for appearance and utility, or may be of light-weight rust-resistant metal. Or, the block and shells may be integrally formed of the same material, again any suitable material being within the scope of selection for commercial purposes. In the instant case, the shells are relatively rigid and respectively have upper leg portions 34 embedded in or otherwise rigidly connected to the block 28 (Figure 3).

Here as in the claims, the expressions "front," "rear," "top," "bottom," etc., are used in the interests of convenience and based on Figure 1 as representative of the typical use of the attachment. Obviously, these terms do not therefore limit the invention.

The shells have front and rear marginal edge portions 36 and 38 turned or otherwise formed in opposite laterally outward directions to form front and rear enlarged spaces or mouths 40 and 42 for accommodating the thumb and forefinger of the user and thus facilitating handling of the appurtenant article in the insertion and withdrawal thereof between the shells. As an adjunct to this phase, the lower marginal edge portions 44 of the shells are turned oppositely laterally outwardly to form a mouth 46 whereby insertion of the article is made easier.

Since the shells 30 are relatively rigid, and depend from the block 28, which as stated is resilient, the shells serve as lever arms connected to the jaws 32a and in this respect function to control the pole-gripping capacity of the jaws or pole-gripping means by controlling the width of the slot 32 and the pressure on the jaws. Figure 3 shows the shells empty and the lower edges 44 thereof are accordingly spaced apart at what may be considered a neutral spacing. When an article, such as the bobber 18, is inserted through the mouth 46, the shells spread apart to receive the article and, depending upon the size of the article, the shells will remain spread to clamp the article or will return to their neutral spacing when a smaller article enters within the shells. In the first respect, the shells constitute article-gripping means and in the second respect constitute article-holding means. In either case, since the shells are connected to the block 28, their lever-arm function bends the block about an axis lengthwise of or fore-and-aft through the slot 32 and thereby creates laterally inwardly acting compressive forces narrowing the slot 32 and thereby increasing the grip of the block jaws on the pole. The pole has been omitted from Figures 3, 4 and 5 to emphasize the control of the width of the slot, and it will be understood that when the pole is present the slot will not actually narrow but the narrowing tendency is present and the slot-bordering jaws 32a of the block are in compression to grip the pole more tightly.

Conversely, in the absence of an article, the shells may move toward each other, as when squeezed inwardly to narrow the mouth 46 (Figure 5) which reduces the neutral spacing of the shells as in Figure 3 and thus reverses the bending of the block 28 at the axis of the slot 32 so that tensional forces are created which actually widen the slot and relax the grip of the block jaws on the pole. Thus, after the article has been removed from the element 20, the element may be squeezed at the shells 30 to relax the jaws 32a so that the element may be removed from or adjusted along the pole. Since poles are conventionally tapered, it is preferred that the slot have generally the keyhole shape as shown so that it will effectively grip small—as well as large—diameter portions of the pole.

One distinct advantage of the structure just described is that the initial bias in the block is such that the empty element will effectively grip the pole sufficiently to retain the element in position against dislodgment by normal occurrences. However, during the act of insertion or withdrawal of the article, the shells are spread and the bias or loading of the block increases to accentuate the grip of the block jaws 32a on the pole, thus preventing inadvertent disconnection of the element from the pole during periods when actual external forces are deliberately applied to the element. The advantages of requiring squeezing of the shells to relax the grip of the block will be obvious without elaboration.

As indicated, the present disclosure is representative and points up a preferred embodiment of the invention and many of its salient features and objects and typical uses. Other advantages and uses, as well as variations in structure and function will readily occur to those versed in the art, and these may be exploited without departure from the spirit and scope of the invention.

What is claimed is:

1. A fishing pole attachment of the class described, comprising: an upper member of resilient flexible material having top and bottom portions and including in its top portion a pole-gripping slot opening upwardly; and a pair of complementary generally hemispherical shells rigid with and depending from the bottom portion of the upper member and spaced apart respectively at opposite sides of the median plane through said slot to afford a two-piece generally spherical receptacle for a fishing article such as a bobber or the like; said shells serving as lever arms adapted to be spread apart by the insertion of such article and acting thereby to apply laterally inwardly acting compression forces in the upper member tending to narrow the slot so as to increase its pole-gripping capacity while the article is retained by the shells; and said shells when squeezed together in the absence of such article, causing outward tensional forces in said upper member tending to widen said slot so as to relax the grip of said member on the pole whereby the attachment may be mounted on and dismounted from the pole respectively in opposite directions normal to the length of the pole.

2. The invention defined in claim 1, in which: the front and rear marginal edges of the shells are turned oppositely laterally outwardly to increase the spacing of the shells at said edges for accommodating the thumb and forefinger of a person in the insertion and withdrawal of an article relative to said receptacle afforded by the shells.

3. The invention defined in claim 1, in which: the lower marginal edges of the shells are turned oppositely laterally outwardly to afford a mouth facilitating insertion of such article between the shells.

4. The invention defined in claim 1, in which: the front and rear marginal edges of the shells are turned oppositely laterally outwardly to increase the spacing of the shells at said edges for accommodating the thumb and forefinger of a person in the insertion and withdrawal of an article relative to said receptacle afforded by the shells and the lower marginal edges of the shells are turned oppositely laterally outwardly to afford a mouth facilitating insertion of such article between the shells.

5. The invention defined in claim 1, in which: the upper member is a block of elastomer material and each shell is a rigid element having an upper part embedded in said block.

6. A fishing pole attachment of the class described, comprising: an upper member of resilient flexible material having top and bottom portions and including in its top portion a pole-gripping slot opening upwardly; and a pair of complementary generally hemispherical shells rigid with and depending from the bottom portion of the upper member and spaced apart respectively at opposite sides of the median plane through said slot to afford a two-piece generally spherical receptacle for a fishing article such as a bobber or the like; the resilience of the upper member enabling the shells to be spread apart for receiving and holding such article.

7. The invention defined in claim 6, in which: the front and rear marginal edges of the shells are turned oppositely laterally outwardly to increase the spacing of the shells at said edges for accommodating the thumb and forefinger of a person in the insertion and withdrawal of an article relative to said receptacle afforded by the shells.

8. The invention defined in claim 6, in which: the lower marginal edges of the shells are turned oppositely laterally outwardly to afford a mouth facilitating insertion of such article between the shells.

9. The invention defined in claim 6, in which: the front and rear marginal edges of the shells are turned oppositely laterally outwardly to increase the spacing of the shells at said edges for accommodating the thumb and forefinger of a person in the insertion and withdrawal of an article relative to said receptacle afforded by the shells, and the lower marginal edges of the shells are turned oppositely laterally outwardly to afford a mouth facilitating insertion of such article between the shells.

References Cited in the file of this patent

UNITED STATES PATENTS

| | | |
|---|---|---|
| 1,783,119 | Hacking | Nov. 25, 1930 |
| 2,002,001 | Beard | May 21, 1935 |
| 2,519,987 | Wernette | Aug. 22, 1950 |
| 2,650,448 | Lichtig | Sept. 1, 1953 |
| 2,783,515 | Tobias | Mar. 5, 1957 |